Figures 1, 2:
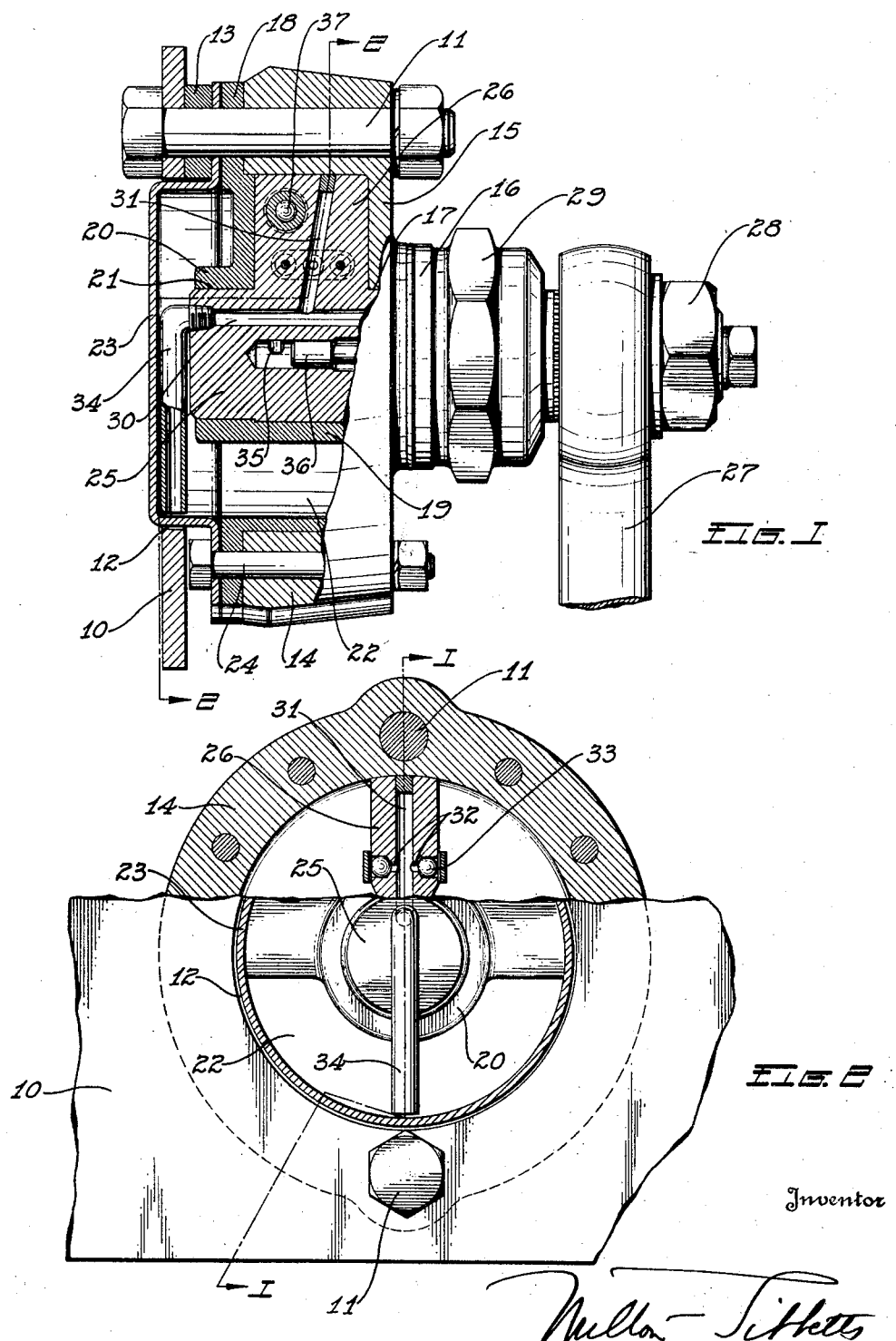

June 24, 1930.    M. TIBBETTS    1,766,848
SHOCK ABSORBER
Filed Nov. 28, 1927

Inventor
Milton Tibbetts

Patented June 24, 1930

1,766,848

UNITED STATES PATENT OFFICE

MILTON TIBBETTS, OF DETROIT, MICHIGAN, ASSIGNOR TO PACKARD MOTOR CAR COMPANY, OF DETROIT, MICHIGAN, A CORPORATION OF MICHIGAN

SHOCK ABSORBER

Application filed November 28, 1927. Serial No. 236,046.

This invention relates to motor vehicles and particularly to shock absorbing means therefor. The invention relates more specifically to hydraulic shock absorbers of the vane piston type.

In shock absorbers of this type there is always some small amount of leakage of oil from the casing and usually an auxiliary reservoir or chamber is provided from which oil is drawn to supply the casing as it is needed. It is one of the objects of the present invention to so construct the casing and the auxiliary chamber that these parts may be made tight and may be kept tight.

Another object of the invention is to simplify the construction of the parts both as to their form and to the machine work required on them.

Another object of the invention is to provide a simple connecting means from the piston to the lower part of the auxiliary chamber for withdrawing oil from the chamber for supplying the needs of the casing.

Other objects of the invention will appear from the following description taken in connection with the drawings, which form a part of this specification, and in which:

Fig. 1 is a section through the body of the shock absorber made in accordance with this invention, certain parts thereof being shown in elevation, the section being approximately on the line 1—1 of Fig. 2, and Fig. 2 is a section substantially on the line 2—2 of Fig. 1.

The support for the shock absorber is indicated at 10, this being a plate to which the shock absorber is secured by two or more bolts 11. The plate 10 is formed with an opening 12 therein through which a part of the shock absorber projects, and a spacing washer 13 is provided so that the shock absorber may be spaced slightly from the support to provide clearance for its connecting bolts as will hereinafter appear.

The shock absorber proper comprises a casing 14 having an end wall 15 and a central boss 16, said boss having a bearing opening 17 therein. The opposite end wall of the casing is formed by a cover 18 which has a part 19 extending into the casing and forming an abutment for the interior of the casing. This cover is also formed with an outwardly extending boss 20 having an opening 21 therein, in line with the opening 17 of the casing. The part 19 which extends into the casing is hollowed out to form a chamber 22 and this chamber is enlarged and completely enclosed by a second cover or plate 23 which extends over and is spaced from the cover 18. Thus is provided a rather large auxiliary chamber for an additional supply of oil for the shock absorber.

The casing 14, the cover 18, and the second cover or plate 23 are all three secured together by several bolts 24, in addition to the two bolts 11 above referred to. These bolts secure the parts together in such close relationship that there can be no leakage to the outside at any point.

Within the casing is a shaft 25 upon which is a piston 26 preferably formed as a part of the shaft, and this shaft is mounted in the bearing openings 17 and 21 above referred to. One end of the shaft extends entirely through the boss 16 and upon its outer end is an operating arm 27 secured thereon as by a nut 28. Suitable packing is provided in the boss 16 and is held in place by a nut 29 on the boss.

The opposite end of the shaft 25 is mounted in the boss 20 and extends through the opening 21 into the chamber 22. At least the end of the shaft is exposed to the chamber and any leakage past the shaft will be caught in the chamber.

The shaft 25 is drilled lengthwise as at 30 to form an oil conduit, and a passage 31 in the piston communicates with the conduit 30 and has cross passages 32 which are provided with check valves 33 opening towards the interior of the casing. These check valves prevent the flow of fluid from the casing into the passage 31 but permit the fluid to flow from the passage 31 into the casing. Thus the passage 31 is always open to the low pressure side of the piston and if there is any lack of oil at that side of the piston suction will be created in the passage 31 and consequently in the conduit 30.

Mounted upon the end of the shaft 25 that is exposed to the chamber 22 is a pipe 34, this pipe having an elbow and preferably threaded into the end of the shaft so that it communicates with and forms a continuation of the conduit 30. The pipe extends downwardly to near the bottom of the chamber 22 and is preferably vertically arranged, as shown in Fig. 2, when the piston 26 is in its intermediate position. As the piston swings back and forth in the operation of the shock absorber, the pipe 34 will of course swing with it, but it will always be adjacent the lower part of the chamber 22. The suction in the conduit 30 is of course communicated to the pipe 34 and consequently whenever there is a lack of oil in the casing an additional supply will be drawn through the pipe 34, conduit 30 and passage 31, from the chamber 22.

A by-pass 35 and a metering plug 36 may be provided in the piston and shaft if desired, to permit the passage of a small amount of fluid from one side of the piston to the other in order that too great a resistance to the operation of the piston may not be created.

Also, a check valve controlled by-pass 37 may be provided in the piston if desired in order that greater resistance may be offered in one direction than in the other.

It will be observed that the cover piece 18 is of very simple form, easily made of either a cored casting or a drop forging, easily machined, and easily ground, together with the casing 14, to form a close fitting casing for the piston. The second cover 23 may be formed of a simple stamping and all of the parts are secured together to secure the greatest certainty against leakage.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a shock absorber, a casing, a piston in the casing, a shaft for the piston, an auxiliary supply chamber, and a tube on the shaft extending into said supply chamber.

2. In a shock absorber, a casing, a piston in the casing, a shaft for the piston, an auxiliary supply chamber, and a pipe mounted on the shaft and adapted to oscillate therewith.

3. In a shock absorber, a casing, a piston in the casing, a shaft for the piston, an auxiliary supply chamber, and a pipe connection mounted on the shaft and communicating with the casing through the piston.

4. In a hydraulic shock absorber, the combination of a casing, a cover for the casing, a piston operating in the casing and having a shaft extending through the cover, an auxiliary chamber beyond the cover, and a pipe on said shaft in said chamber.

5. In a hydraulic shock absorber, the combination of a casing, a cover therefor having an opening therethrough, a chamber formed beyond the cover, a piston in the casing, a shaft for said piston mounted in said opening and conduit means extending from the chamber through the opening in the cover.

6. In a hydraulic shock absorber, the combination of a casing having a cylindrical part and end walls, alined bearing openings through the end walls, a piston in the cylindrical part of said casing and having a shaft mounted in said bearing openings, said shaft extending through one of said openings and having an operating arm on its outer end, and an auxiliary chamber into which the other end of said shaft extends.

7. In a shock absorber, the combination of a casing, a supply chamber, a piston in the casing having a shaft extending into but not through the supply chamber, and means in the shaft and piston for withdrawing oil from the supply chamber to the casing.

8. In a shock absorber, the combination of a casing, an auxiliary chamber, a piston in the casing having a shaft extending into said chamber, and a pipe on said shaft extending to the lower part of said chamber when the piston is in intermediate position.

9. In a shock absorber, the combination of a casing, an auxiliary chamber, a piston in the casing having a shaft, and means on the shaft for withdrawing oil from the lower part of the chamber.

10. In a shock absorber, the combination of a casing, an auxiliary chamber, a piston in the casing, a pipe secured to the piston shaft and extending into the chamber, and means comprising a passage and check valves in the piston communicating with said pipe for withdrawing oil from the chamber.

11. In a shock absorber, the combination of a casing having a central opening in an end wall thereof, a piston in the casing having a shaft mounted in and extending through said opening, a cover over the end wall and shaft end to form a chamber, and means on the shaft extending to the lower part of the casing for withdrawing oil therefrom.

12. In a hydraulic shock absorber, a casing, a cover therefor having an opening therethrough, a piston operating in the casing having a shaft extending through the cover, a second cover for the casing bearing upon the first named cover and forming a chamber with the first named cover and the end of the shaft, and conduit means extending through the opening in the cover through which fluid from the chamber is moved to the casing.

13. In a shock absorber, a casing, a cover therefor having an opening therethrough, a piston operating in the casing and engaging said cover, a shaft for the piston extending through the cover and a second cover for the casing bearing upon the first named cover and conduit means extending through the opening in the cover.

14. In a hydraulic shock absorber, a casing having a working chamber therein, a cover therefor having an opening therethrough, a piston operating in the working chamber in the casing and engaging said cover, a shaft for the piston extending through the cover, a second cover for the casing bearing upon the first named cover and extending over the first named cover and over the shaft and conduit means extending through the opening in the cover.

In testimony whereof I affix my signature.

MILTON TIBBETTS.